(12) United States Patent
Botkin et al.

(10) Patent No.: US 12,020,163 B2
(45) Date of Patent: Jun. 25, 2024

(54) KNOWLEDGE PERSISTENT AND STRUCTURALLY DYNAMIC NEURAL NETWORK

(71) Applicant: Bank of America Corporation, Charlotte, NC (US)

(72) Inventors: Garrett Thomas Botkin, Charlotte, NC (US); Matthew Bruce Murray, Roanoke, TX (US)

(73) Assignee: Bank of America Corporation, Charlotte, NC (US)

( * ) Notice: Subject to any disclaimer, the term of this patent is extended or adjusted under 35 U.S.C. 154(b) by 981 days.

(21) Appl. No.: 16/781,656

(22) Filed: Feb. 4, 2020

(65) Prior Publication Data
US 2021/0241092 A1    Aug. 5, 2021

(51) Int. Cl.
*G06N 3/084* (2023.01)
*G06N 3/04* (2023.01)
*G06N 3/063* (2023.01)

(52) U.S. Cl.
CPC .............. *G06N 3/084* (2013.01); *G06N 3/04* (2013.01); *G06N 3/063* (2013.01)

(58) Field of Classification Search
CPC ........... G06N 3/084; G06N 3/04; G06N 3/063
See application file for complete search history.

(56) References Cited

U.S. PATENT DOCUMENTS

| | | |
|---|---|---|
| 5,313,559 A | 5/1994 | Ogata et al. |
| 5,408,588 A | 4/1995 | Ulug |
| 5,710,830 A | 1/1998 | Holeva |
| 6,249,755 B1 | 6/2001 | Yemini et al. |
| 6,278,985 B1 | 8/2001 | Hatayama |
| 6,317,730 B1 | 11/2001 | Neuneier et al. |
| 6,473,746 B1 | 10/2002 | Zakrzewski |
| 6,745,169 B1 | 6/2004 | Schlang et al. |
| 7,058,455 B2 | 6/2006 | Huie, Jr. et al. |

(Continued)

OTHER PUBLICATIONS

Han, S., Mao, H., & Dally, W. J. (2015). Deep compression: Compressing deep neural networks with pruning, trained quantization and huffman coding. arXiv preprint arXiv:1510.00149. (Year: 2015).*

(Continued)

*Primary Examiner* — Kamran Afshar
*Assistant Examiner* — Lokesha G Patel

(57) ABSTRACT

A method includes receiving a request to solve a problem defined by input information and applying a neural network to generate an answer to the problem. The neural network includes an input level, a manager level including a first manager, a worker level including first and second workers, and an output level. Applying the neural network includes implementing the input level to provide a piece of input information to the first manager; implementing the first manager to delegate portions of the piece of information to the first and second workers; implementing the first worker to operate on its portion of information to generate a first output; implementing the second worker to operate on its portion of information to generate a second output; and implementing the output level to generate the answer to the problem, using the first and second outputs. The method also includes transmitting a response comprising the answer.

18 Claims, 8 Drawing Sheets

(56) References Cited

U.S. PATENT DOCUMENTS

| | | |
|---|---|---|
| 7,113,931 B1 | 9/2006 | Ugajin et al. |
| 7,392,230 B2 | 6/2008 | Nugent |
| 7,426,501 B2 | 9/2008 | Nugent |
| 7,895,140 B2 | 2/2011 | Nagashima |
| 7,895,641 B2 | 2/2011 | Schneier et al. |
| 8,156,057 B2 | 4/2012 | Nugent |
| 8,630,966 B2 | 1/2014 | Gage et al. |
| 8,762,306 B2 | 6/2014 | Cameron et al. |
| 8,874,496 B2 | 10/2014 | Lazar et al. |
| 9,798,751 B2 | 10/2017 | Birdwell et al. |
| 10,043,129 B2 | 8/2018 | Georgopoulos |
| 10,686,869 B2 * | 6/2020 | Chilimbi ............... G06N 3/084 |
| 2003/0004906 A1 | 1/2003 | Lapointe et al. |
| 2003/0190603 A1 | 10/2003 | Larder et al. |
| 2003/0236760 A1 | 12/2003 | Nugent |
| 2004/0128003 A1 | 7/2004 | Frampton et al. |
| 2004/0131998 A1 | 7/2004 | Marom et al. |
| 2004/0162796 A1 | 8/2004 | Nugent |
| 2004/0193558 A1 | 9/2004 | Nugent |
| 2008/0058223 A1 | 3/2008 | Ma et al. |
| 2008/0071588 A1 | 3/2008 | Eder |
| 2009/0003217 A1 | 1/2009 | Ferra et al. |
| 2009/0228415 A1 | 9/2009 | Nugent |
| 2014/0324747 A1 | 10/2014 | Crowder et al. |
| 2017/0308789 A1 | 10/2017 | Langford et al. |
| 2018/0211156 A1 | 7/2018 | Guan et al. |
| 2018/0307231 A1 | 10/2018 | Sorton et al. |
| 2018/0322241 A1 | 11/2018 | Buchanan |
| 2019/0095778 A1 | 3/2019 | Buchanan |
| 2019/0139622 A1 | 5/2019 | Osthege |
| 2019/0180187 A1 | 6/2019 | Rawal et al. |
| 2019/0370653 A1 | 12/2019 | Chakrabartty et al. |
| 2020/0005148 A1 | 1/2020 | Nori et al. |

OTHER PUBLICATIONS

Shen, J., & Shafiq, M. O. (Dec. 2018). Deep learning convolutional neural networks with dropout—a parallel approach. In 2018 17th IEEE International Conference on Machine Learning and Applications (ICMLA) (pp. 572-577). IEEE. (Year: 2018).*

Sak, H., Vinyals, O., Heigold, G., Senior, A., McDermott, E., Monga, R., & Mao, M. (2014). Sequence discriminative distributed training of long short-term memory recurrent neural networks. (Year: 2014).*

Hunt, T., Song, C., Shokri, R., Shmatikov, V., & Witchel, E. (2018). Chiron: Privacy-preserving machine learning as a service. arXiv preprint arXiv:1803.05961. (Year: 2018).*

Banharnsakun, A. (2019). Towards improving the convolutional neural networks for deep learning using the distributed artificial bee colony method. International journal of machine learning and cybernetics, 10(6), 1301-1311. (Year: 2019).*

U.S. Appl. No. 10/496,922, filed Dec. 3, 2019, Dockendorf, et al.

Karras et al; Progressive Growing of GANs for Improved Quality, Stability, and Variation; Published as a conference paper at ICLR 2018; 26 pages, Feb. 26, 2018.

* cited by examiner

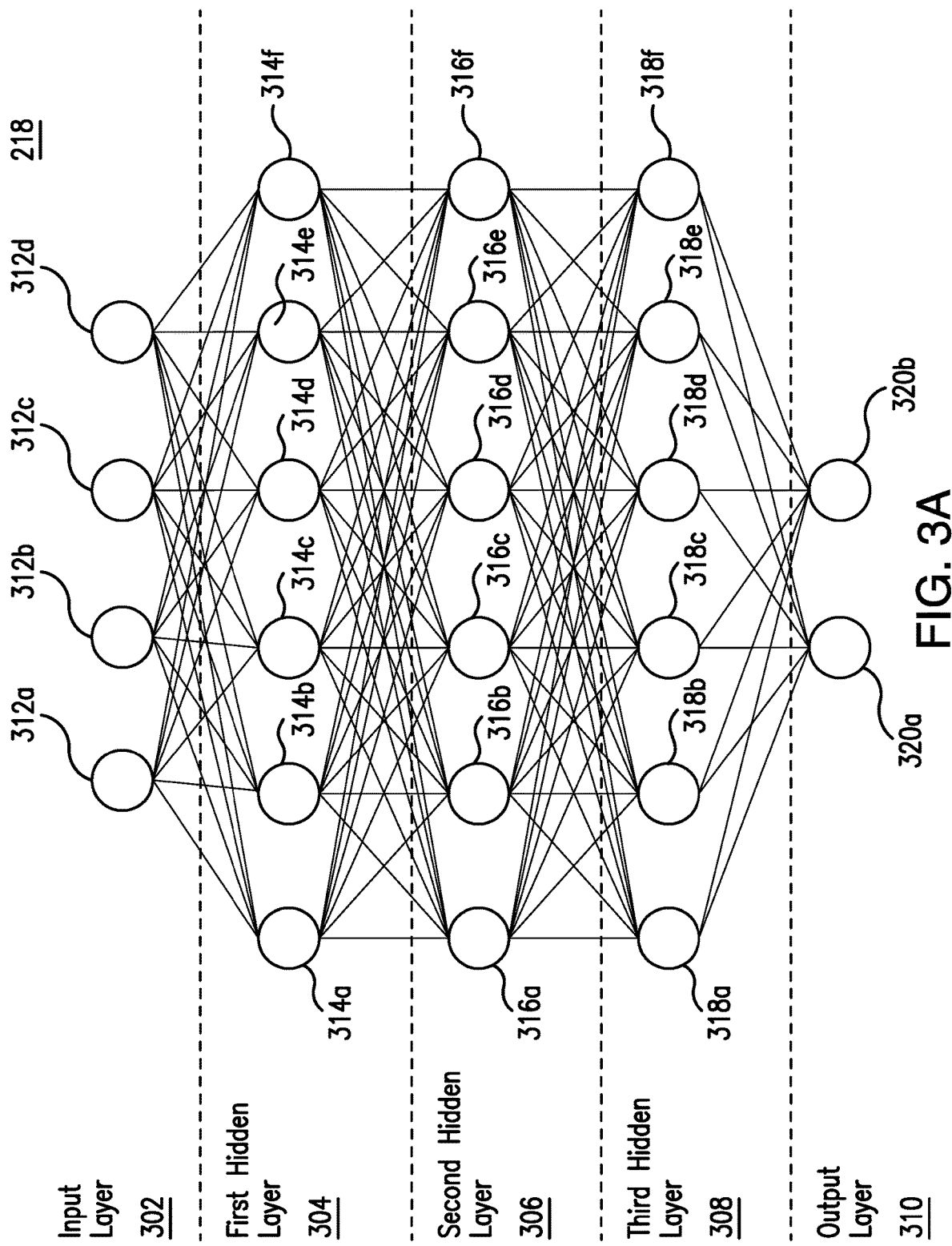

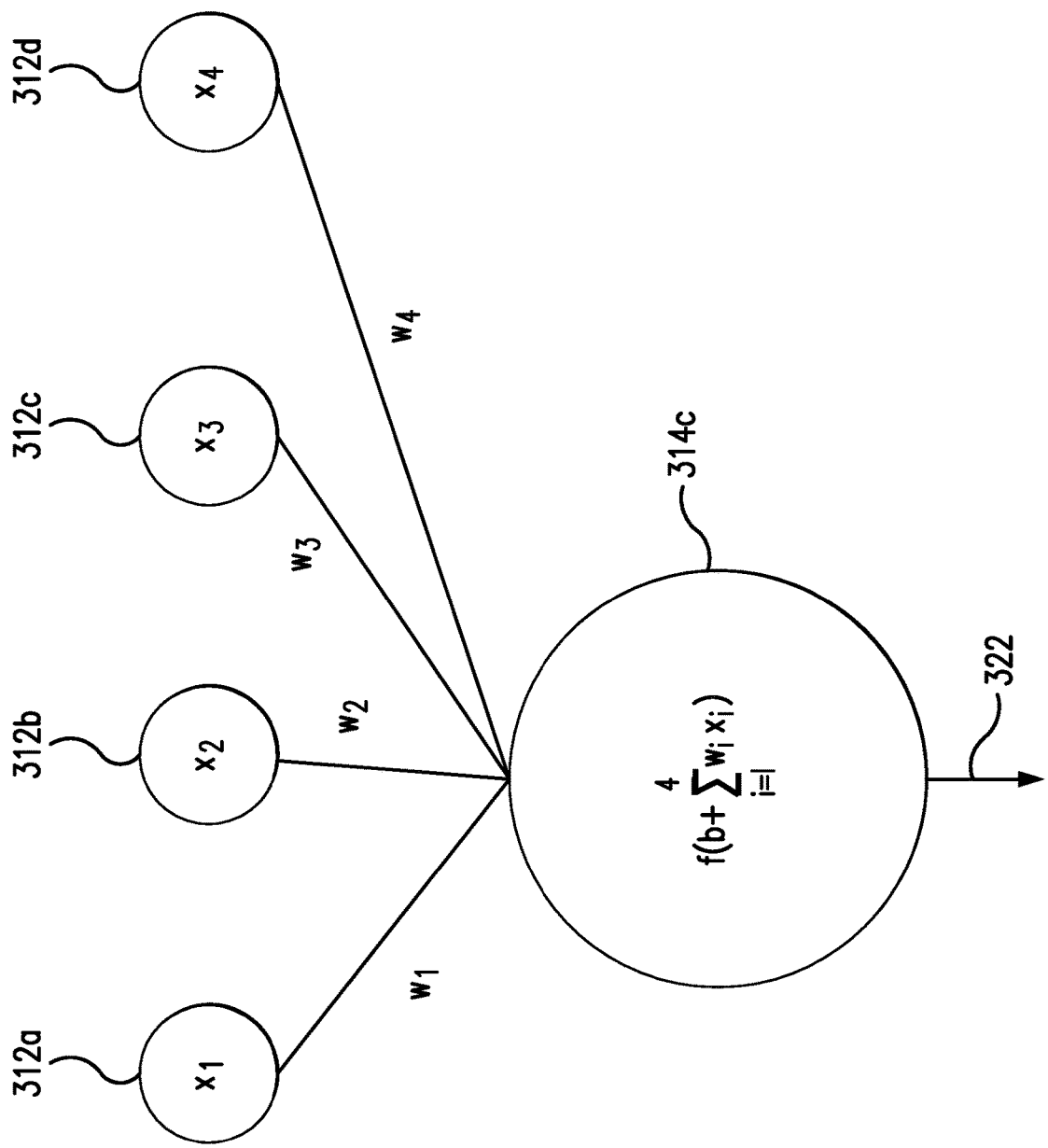

KNOWLEDGE PERSISTENT AND STRUCTURALLY DYNAMIC NEURAL NETWORK

TECHNICAL FIELD

The present disclosure relates generally to artificial intelligence, and more particularly, to a neural network that is both knowledge persistent and structurally dynamic.

BACKGROUND

A neural network is an artificial system inspired by the network of neurons within biological organisms. Each neural network is typically defined by a set of processing elements (nodes) that are interconnected through a set of weights. Each node of the network can accept input signals and process the input signals to generate an output signal, which may then be fed to other connected nodes according to the weights used to define the connections. These weights are dynamic and may be modified in response to training of the network. Training is typically an iterative process in which individual weights, defined between pairs of nodes, are repeatedly adjusted, until the network converges to produce a desired output.

SUMMARY

A neural network is an artificial system inspired by the network of neurons present within the biological organisms. Neural networks have proven highly versatile in recent years, having been implemented to address a range of problems including speech recognition, object identification, image processing, and data validation, among others. Each neural network is typically defined by a set of processing elements (nodes) that are interconnected through a set of weights. For example, a neural network may include a set of nodes formed into multiple layers that include: (1) an input layer, (2) one or more hidden layers, and (3) an output layer, with the nodes in each layer interconnected with the nodes in adjacent layers. Each node can accept input signals and process the input signals to generate an output signal. For example, a given node in a first hidden layer may accept input signals from the nodes in the input layer, process these input signals to generate an output signal, and then pass the output signal as input signals (appropriately modified according to the weights defining the connections between nodes) to the nodes in the second hidden layer. The weights used to define the connections between nodes are dynamic and may be adjusted in response to training of the network. Training is typically an iterative process in which individual weights are repeatedly adjusted, until the network converges to produce a desired output.

The architecture of a conventional neural network is static in nature, such that once a set of nodes has been chosen and the network has been trained, it is extremely difficult, if not impossible, to add new nodes to the network or remove existing nodes from the network without losing the wealth of information and experience that the neural network had previously accumulated. This problem arises because, traditionally, the entire neural network is trained as a single unit to solve each problem it is given. This results in a set of carefully balanced weights, which are generally unable to adjust to even a slight change in the way the network is structured. As a result, any changes in network structure typically lead to a collapse in the trained model, such that any previous learning is lost, and the neural network should be retrained from the ground up, potentially leading to a significant waste of processing resources.

This disclosure contemplates a knowledge persistent, yet structurally dynamic neural network that addresses one or more of the above technical problems. Rather than providing the entire neural network with access (either direct or indirect) to the input information fed into the network, the knowledge persistent and structurally dynamic neural network uses a set of manager nodes to delegate different portions of the input information down to sets of worker nodes. Each set of worker nodes corresponds to a separate segment of the neural network and is primarily aware of the information delegated to it by its assigned manager node. In this manner, worker nodes may receive small questions, broken down for them by the manager nodes, thereby becoming specialized to answer a small piece of the larger question defined by the input information. Since the worker nodes primarily receive the information delegated to them by their assigned manager node, they are generally not aware of which piece of the larger question they are specialized to answer, or even that there is a larger question and that they are answering a part of it.

Because of this worker specialization, each set of worker nodes that is assigned to a given manager is not aware when other workers and/or managers are added to the neural network or removed from the neural network. As a result, the neural network may be scaled at runtime (e.g., worker and/or manager nodes may be added or removed), without retraining the neural network from the ground up. Certain embodiments of the knowledge persistent and structurally dynamic neural network are described below.

According to one embodiment, an apparatus includes a memory and a hardware processor communicatively coupled to the memory. The memory stores non-transitory computer readable instructions corresponding to a neural network. The neural network includes an input level, a manager level, a worker level, and an output level. The input level is configured, when implemented by the hardware processor, to receive input information. The manager level includes a first manager. The first manager is configured, when implemented by the hardware processor, to operate on a first piece of the input information. The worker level includes a first worker assigned to the first manager and a second worker assigned to the first manager. The first manager is further configured, when implemented by the hardware processor, to delegate a first portion of the first piece of the input information to the first worker. The first worker is configured, when implemented by the hardware processor, to operate on the first portion of the first piece of the input information, using a first set of adjustable parameters, to generate a first output. The first manager is additionally configured, when implemented by the hardware processor, to delegate a second portion of the first piece of the input information to the second worker. The second worker is configured, when implemented by the hardware processor, to operate on the second portion of the first piece of input information, using a second set of adjustable parameters, to generate a second output. The output level is coupled to the worker level. The output level is configured, when implemented by the hardware processor, to generate an output, based at least in part on the first output from the first worker and the second output from the second worker. The hardware processor receives a request to solve a problem defined by a set of information. The hardware processor also applies the neural network to the set of information to generate an answer to the problem. Here, the set of information corresponds to the input information received by the input level and the answer to the problem corresponds to the output from the neural network. In response to applying the neural network, the hardware processor transmits a response comprising the answer to the problem.

According to another embodiment, a method includes receiving a request to solve a problem defined by input information. The method also includes applying a neural network to the input information to generate an answer to the problem. The neural network includes non-transitory computer readable instructions corresponding to an input level, a manager level, a worker level, and an output level. The manager level includes a first manager. The worker level includes a first worker assigned to the first manager and a second worker assigned to the first manager. Applying the neural network includes implementing the input level to receive the input information and to provide a first piece of the input information to the first manager. Applying the neural network also includes implementing the first manager to delegate a first portion of the first piece of the input information to the first worker and to delegate a second portion of the first piece of the input information to the second worker. Applying the neural network additionally includes implementing the first worker to operate on the first portion of the first piece of the input information, using a first set of adjustable parameters, to generate a first output. Applying the neural network further includes implementing the second worker to operate on the second portion of the first piece of the input information, using a second set of adjustable parameters, to generate a second output. Applying the neural network also includes implementing the output level to generate an output, based at least in part on the first output from the first worker and the second output from the second worker. The output comprises the answer to the problem. In response to applying the neural network, the method also includes transmitting a response comprising the answer to the problem.

Certain embodiments provide one or more technical advantages. As an example, an embodiment conserves processing resources that would otherwise be expended by retraining a neural network from the ground up any time the problem that the network was originally designed to answer has grown or changed too much for the network to answer without overwriting historical context. For example, consider a situation in which the problem that a neural network was originally employed to answer has changed very suddenly. A traditional neural network would have to overwrite its historical knowledge with new knowledge, in order to learn the skills necessary for answering the new problem. However, if the problem eventually shifts back to its former structure, the network will no longer be able to answer the old problem and will have to relearn all of the old knowledge that it lost in adapting to the new problem (and in the process, also overwrite the new knowledge that it had accumulated). Thus, considerable processing resources will be expended in training and retraining the network. In contrast, in certain embodiments, additional worker nodes may simply be added to the knowledge persistent and structurally dynamic neural network of the present disclosure, in order to expand the network to handle the new problem cases. This leaves the old knowledge intact, while nevertheless allowing the network to learn new skills necessary to answer the new problem. The result is a neural network capable of handling both the old problem and the new problem.

Consider, as another example, a situation in which, rather than changing suddenly, the problem that the neural network was designed to answer changes slowly over time. In such a situation, the output of the neural network may grow inaccurate over time as the problem evolves. In the context of traditional neural networks, one solution to this issue may be to retrain the neural network each day, thereby making subtle changes to the neural network such that it may keep up with the evolution of the problem. However, retraining the neural network every day may consume significant computational resources which may not be justifiable, considering the limited pay off in course correction that such training may have. On the other hand, waiting too long may result in the traditional neural network not being able to adjust its learning to account for the new parameters of the problem, leading to a need to retrain the entire neural network from scratch. This too may result in a significant waste of computational resources. In contrast, the knowledge persistent and structurally dynamic neural network of the present disclosure may be left on its own, without any retraining, until the error in the output generated by the network reaches an unacceptable level, at which point the network may be retrained without fear of having to retrain the network from the ground up. This is because the network is capable of gaining new learning and adjusting irrelevant parts of its knowledge without affecting the network as a whole.

As another example, certain embodiments may help to conserve computational resources in situations in which a user wishes to determine multiple metrics from the same input data. Because workers inside the knowledge persistent and structurally dynamic neural network may specialize to answer a single part of the classification problem, a single neural network may be used to determine multiple metrics from a set of input data. In contrast, when approaching such a problem with traditional neural network technology, it is typically easier to implement multiple networks (one for each desired metric) and to separately train each network to classify its own, single metric, than it is to train a single traditional neural network to classify all of the desired metrics at the same time. This is because every node in a traditional neural network sees all of the input information provided to the network such that none of the nodes are able to specialize to determine just a single part of the classification problem. As a result, the use of multiple traditional neural networks to determine multiple metrics from the same input data may require a greater total number of computational nodes and more training to be performed on these computational nodes than a single instance of the knowledge persistent and structurally dynamic neural network of the present disclosure, leading to a greater expenditure of processing resources. In addition, storing and tracking multiple traditional neural networks may consume more memory and storage space as compared with storing a single instance of the knowledge persistent and structurally dynamic neural network of the present disclosure.

As another example, certain embodiments help to avoid the downtime that would otherwise be spent tearing down a neural network that has grown obsolete and rebuilding/retraining a new neural network from the ground up. As a further example, certain embodiments help to conserve computational resources otherwise consumed by creating multiple versions of the same neural network, with each version trained to answer a slightly adjusted version of the same problem. Instead, in response to encountering a slightly adjusted version of the original problem, in certain embodiments, additional worker nodes may simply be added to the knowledge persistent and structurally dynamic neural network of the present disclosure, which are capable of dealing with a new specialization associated with the slight adjustment to the original problem, leaving the rest of the workers to operate on the original version of the problem. This avoids the redundancy that results from multiple versions of the same neural network having to learn the same basic knowledge over and over again.

The system described in the present disclosure may particularly be integrated into a practical application of a neural network for use in a variety of different artificial intelligence applications. For example, the neural network may be integrated into a handwriting recognition tool, a voice recognition tool, a data validation tool, and/or any other application that relies on neural networks to analyze problems and generate solutions.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 3A illustrates an example architecture for the worker nodes of the example neural network of FIG. 2;

FIG. 3B illustrates an example of an activation function assigned to a worker node of the example neural network of FIG. 2;

DETAILED DESCRIPTION

Embodiments of the present disclosure and its advantages may be understood by referring to FIGS. 1 through 6 of the drawings, like numerals being used for like and corresponding parts of the various drawings.

Figure 1:
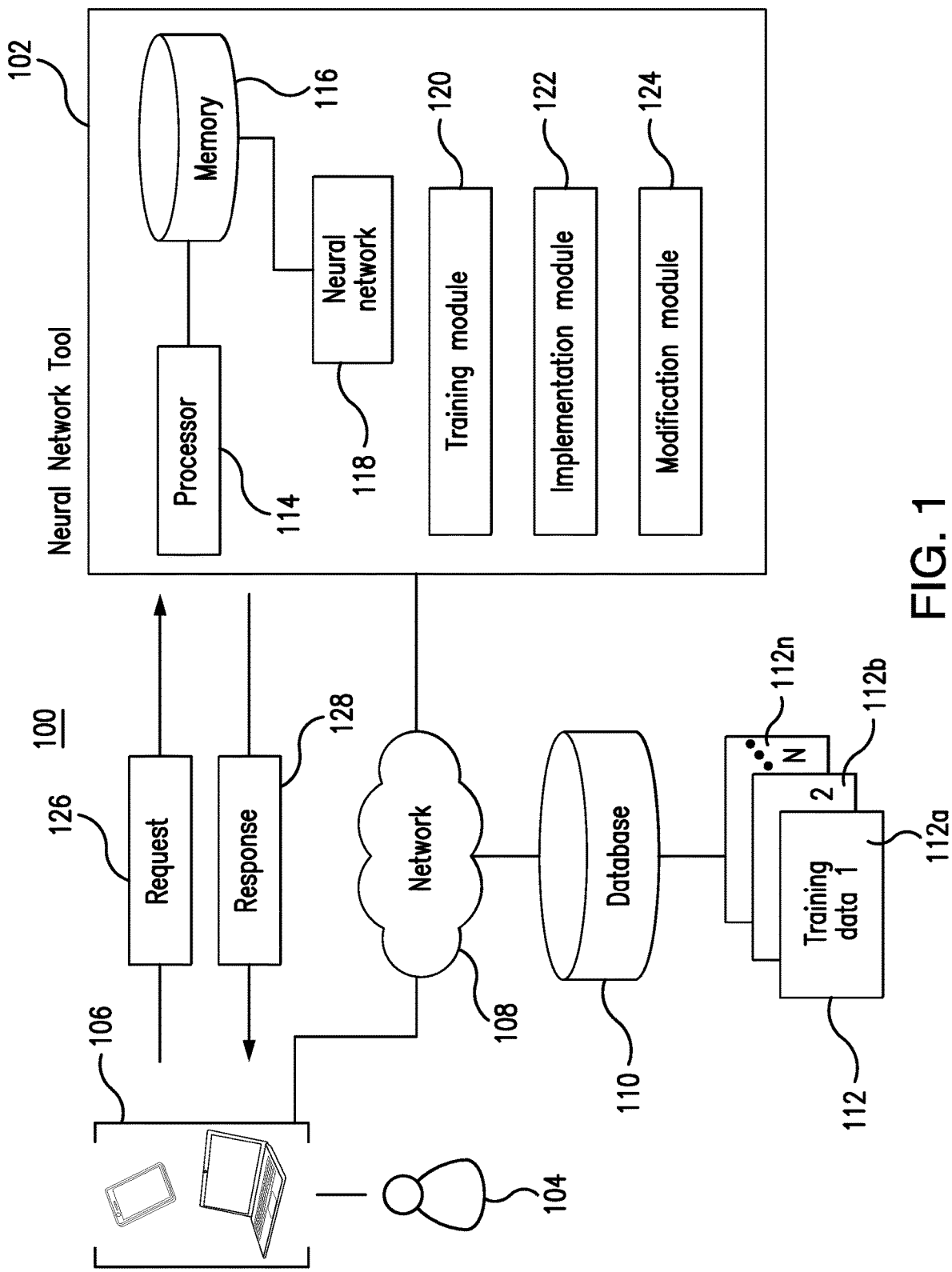
FIG. 1 illustrates an example system used to implement the knowledge persistent and structurally dynamic neural network of the present disclosure.

I. System Overview FIG. 1 illustrates an example system 100 that includes neural network tool 102, users 104, devices 106, network 108, and database 110. Generally, neural network tool 102 receives requests 126 to: (1) generate neural network 118, (2) train neural network 118, (3) apply neural network 118 to solve a given problem, and/or (4) modify the underlying architecture of neural network 118. The manner by which neural network tool 102 generates, trains, and applies neural network 118 is described in further detail below, in the discussion of FIGS. 2 through 4. The manner by which neural network tool 102 may modify the underlying architecture of neural network 118 is described in further detail below, in the discussion of FIGS. 5A and 5B.

Devices 106 may be used by users 104 to send requests 126 to neural network tool 102. Requests 126 may include any information that a user 104 wishes to transmit to neural network tool 102. As an example, requests 126 may include a request from user 104 for neural network tool 102 to generate neural network 118. For example, request 126 may specify a number of managers to use in neural network 118 and a number of workers to assign to each manager in neural network 118. As another example, requests 126 may include a request from user 104 to train neural network 118. For example, in certain embodiments, request 126 may include a set of training data that may be used by neural network tool 102 to train neural network 118. In some embodiments, request 126 may include a request to use training data 112 stored in database 110 to train neural network 118. As another example, requests 126 may include a request from user 104 to apply neural network 118 to solve a particular problem. For example, request 126 may include information that defines the particular problem that user 104 wishes to be solved. As a further example, requests 126 may include a request from user 104 to modify the architecture of neural network 118. For example, request 126 may include a request to increase the number of nodes in the neural network or to decrease the number of nodes in the neural network.

In certain embodiments, devices 106 may also be used by users 104 to receive responses 128 from neural network tool 102. Responses 128 may include any information transmitted from neural network tool 102 for receipt by user 104. As an example, responses 128 may include output generated by neural network 118. For example, response 128 may include a solution to a particular problem defined by input information submitted in request 126.

Devices 106 include any appropriate device for communicating with components of system 100 over network 108. For example, devices 106 may be a telephone, a mobile phone, a computer, a laptop, a wireless or cellular telephone, a tablet, a server, and IoT device, and/or an automated assistant, among others. This disclosure contemplates devices 106 being any appropriate device for sending and receiving communications over network 108. Device 106 may also include a user interface, such as a display, a microphone, keypad, or other appropriate terminal equipment usable by user 104. In some embodiments, an application executed by a processor of device 106 may perform the functions described herein.

Network 108 facilitates communication between and amongst the various components of system 100. This disclosure contemplates network 108 being any suitable network operable to facilitate communication between the components of system 100. Network 108 may include any interconnecting system capable of transmitting audio, video, signals, data, messages, or any combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 110 may store training data 112. Training data 112 may be used to train neural network 118. Training data 112 may include information defining a set of training questions along with corresponding information defining a set of training answers. As an example, in the context of handwriting analysis, training data 112 may include a set of handwritten words, letters, and/or symbols, along with the corresponding text representations of the words, letters, and/or symbols. In certain embodiments, training data 112 may include multiple sets of training data 112a through 112n. For example, training data 112 may include a first set of training data 112a and a second set of training data 112b. First set of training data 112a may be associated with an original problem and may be used to initially train neural network 118 to solve the original problem. Second set of training data 112b may correspond to a modified version of the original problem and may be used to retrain neural network 118 to solve the modified version of the original problem.

As seen in FIG. 1, neural network tool 102 includes a processor 114 and a memory 116. This disclosure contemplates processor 114 and memory 116 being configured to perform any of the functions of neural network tool 102 described herein. Generally, neural network tool 102 implements training module 120 to generate and/or train neural network 118, implementation module 122 to apply neural network 118 to solve a given problem, and modification module 124 to modify the underlying architecture of neural network 118.

Training module 120 may be a software module stored in memory 116 and executed by processor 114. Training module 120 may be used to generate and/or train neural network 118 using training data 112. The manner by which training module 120 generates and/or trains neural network 118 is described in further detail below, in the discussion of FIGS. 2 through 4.

Implementation module 122 may be a software module stored in memory 116 and executed by processor 114. Implementation module 122 may be used to implement neural network 118 to solve a given problem of the type that neural network 118 has been trained to solve. An example algorithm for implementation module 122 is as follows: (1) receive a request 126 to solve a problem defined by a set of input information; (2) provide neural network 118 with the input information; and (3) apply neural network 118 to the input information to generate a solution to the problem. The manner by which neural network 118 operates to solve a given problem is described in further detail below, in the discussion of FIGS. 2 through 4.

Modification module 124 may be a software module stored in memory 116 and executed by processor 114. Modification module may be implemented to modify the underlying architecture of neural network 118. An example algorithm for modification module 124 is as follows: (1) receive a request 126 to modify neural network 118; (2) if request 126 is to add nodes to neural network 118, add the nodes to neural network 118; (3) if request 126 is to remove nodes from neural network 118, remove the nodes from neural network 118; and (4) implement training module 120 to retrain the modified neural network 118. The manner by which modification module 124 may add and/or remove nodes from neural network 118 is described in further detail below, in the discussion of FIGS. 5A and 5B.

Processor 114 is any electronic circuitry, including, but not limited to microprocessors, application specific integrated circuits (ASIC), application specific instruction set processor (ASIP), and/or state machines, that communicatively couples to memory 116 and controls the operation of neural network tool 102. Processor 114 may be 8-bit, 16-bit, 32-bit, 64-bit or of any other suitable architecture. Processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 114 may include other hardware and software that operates to control and process information. Processor 114 executes software stored on memory to perform any of the functions described herein. Processor 114 controls the operation and administration of neural network tool 102 by processing information received from network 108, device(s) 106, and memory 116. Processor 114 may be a programmable logic device, a microcontroller, a microprocessor, any suitable processing device, or any suitable combination of the preceding. Processor 114 is not limited to a single processing device and may encompass multiple processing devices. For example, in certain embodiments, processor 114 may include a first processing device configured to train and/or implement neural network 118 and a second processing device configured to receive requests 126, generate responses 128, and instruct the first processing device to train and/or implement neural network 118. As an example, the first processing device may receive request 126 to generate and train neural network 118. The first processing device may then instruct the second processing device to generate and train neural network 118. The second processing device may then perform such tasks.

Memory 116 may store, either permanently or temporarily, data, operational software, or other information for processor 114. Memory 116 may include any one or a combination of volatile or non-volatile local or remote devices suitable for storing information. For example, memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 116, a disk, a CD, or a flash drive. In particular embodiments, the software may include an application executable by processor 114 to perform one or more of the functions described herein.

In certain embodiments, memory 112 may also store neural network 118. Neural network 118 may include non-transitory computer readable instructions that may be executed by processor 114. Neural network 118 is configured to receive input information (used to define a problem) and to operate on the input information to generate output information (corresponding to the solution to the problem). Neural network 118 includes one or more managers and one or more workers. Each manager and each worker may correspond to a set of one or more processing nodes. Each processing node may include computer readable instructions configured to receive information and to operate on the received information. When neural network 118 is executed by processor 114, the managers are configured to delegate the input information (used to define the problem) to the workers. Each worker is configured to receive a portion of the input information and to operate on this portion of input information to produce a local output. The output from each worker is then concatenated together to produce the global output for the neural network model. Neural network 118 will be described in further detail below, in the discussion of FIGS. 2 through 5.

Modifications, additions, or omissions may be made to the systems described herein without departing from the scope of the invention. For example, system 100 may include any number of users 104, devices 106, networks 108, and databases 110. The components may be integrated or separated. Moreover, the operations may be performed by more, fewer, or other components. Additionally, the operations may be performed using any suitable logic comprising software, hardware, and/or other logic.

II. Neural Network Architecture

Figure 2:
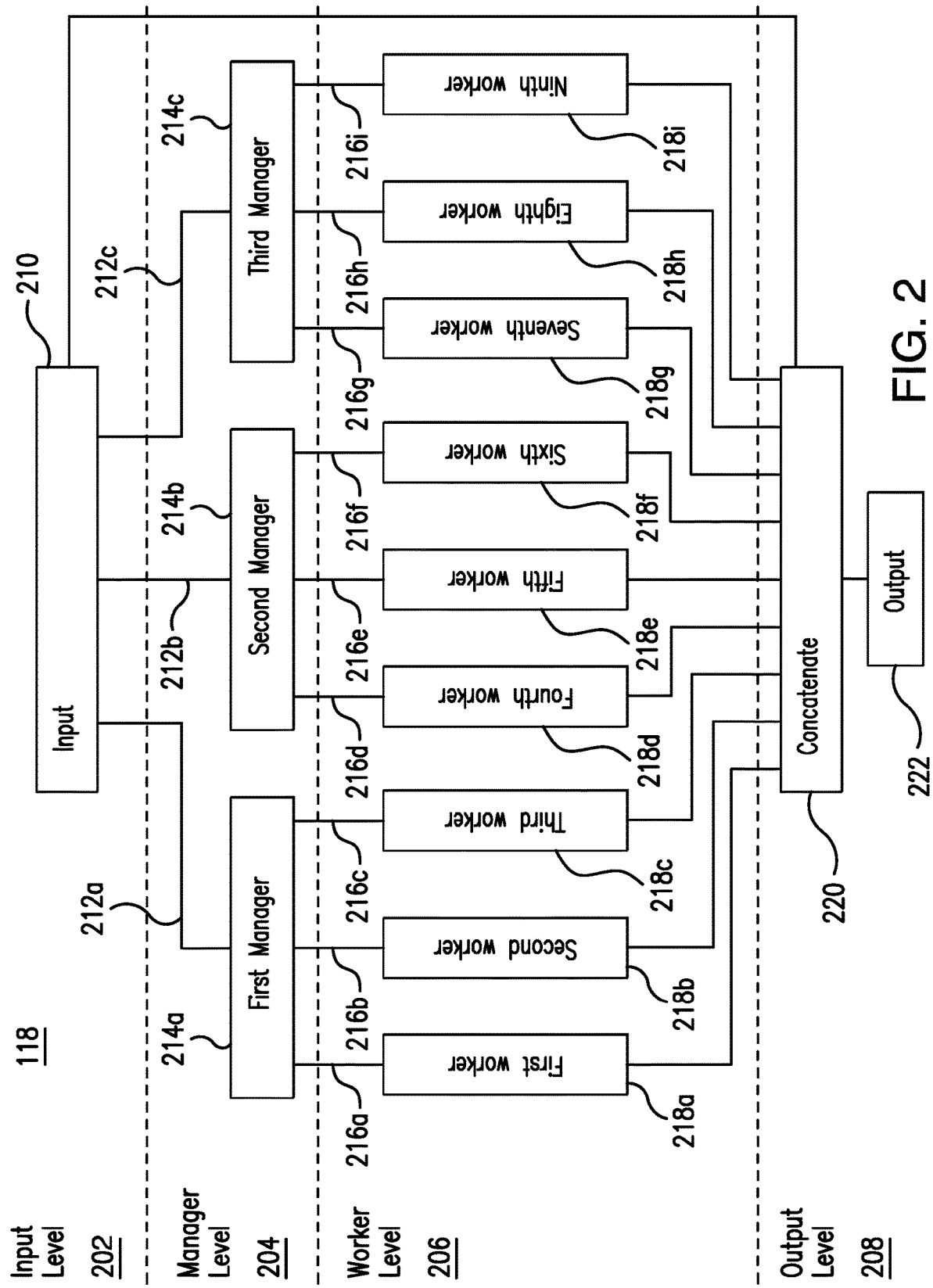
FIG. 2 illustrates the main components of an example knowledge persistent and structurally dynamic neural network.

FIG. 2 illustrates the basic components of an example knowledge persistent and structurally dynamic neural network 118. As illustrated in FIG. 2, neural network 118 includes four levels—input level 202, manager level 204, worker level 206, and output level 208. Each level 202 through 208 may include one or more layers of nodes.

As illustrated in FIG. 2, input level 202 includes input 210. Input 210 may include one or more layers of processing nodes. Input 210 may be thought of as a permanent manager at the top of neural network 118. Input 210 is configured to receive the entirety of the input information that is used to define the problem on which neural network 118 is to operate (e.g., input 210 corresponds to the intake for the entire neural network 118). The number of processing nodes used for input 210 may depend on the size of the input information received by input 210. For example, in certain embodiments, nodes may be added to/removed from input 210 in response to an increase/decrease in the amount of input information provided to input 210.

Input 210 is configured to take the input information and to split it up for managers 214 of manager level 204. For example, if, as illustrated in FIG. 2, manager level 204 includes three managers—first manager 214a, second manager 214b, and third manager 214c—input 210 may be configured to split the input information into first piece of input information 212a for first manager 214a, second piece of input information 212b for second manager 214b, and third piece of input information 212c for third manager 214c. Input 210 is not configured to transform the input information fed into neural network 118 in any way other than to split it up for managers 214a through 214c. Accordingly, the one or more layers of nodes forming input 210 may use default linear activations to process the information they receive.

Immediately below input level 202 is manager level 204. Manager level 204 includes managers 214. Each manager 214 may include one or more layers of processing nodes. Each manager 214 receives a piece the input information delegated to it by input 210. For example, as illustrated in FIG. 2, first manager 214a receives first piece of input information 212a, second manager 214b receives second piece of input information 212b, and third manager 214c receives third piece of input information 212c. In certain embodiments, each manager 214a through 214c may receive all of the input information and may rely on a cropping layer to remove the extra pieces of input information that are not its own. For example, manager 214a may receive first piece of input information 212a, second piece of input information 212b, and third piece of input information 212c, and use a cropping layer to remove second piece of input information 212b and third piece of input information 212, leaving first piece of input information 212a. Such embodiments are described in further detail below, in the discussion of FIG. 4.

In response to receiving a piece of input information 212, each manager 214 is configured to delegate portions 216 of the piece of input information 212 to workers 218, assigned to manager 214. For example, as illustrated in FIG. 2, three workers 218 are assigned to each manager 214—workers 218a through 218c are assigned to first manager 214a, workers 218d through 218f are assigned to second manager 214b, and workers 218g through 218i are assigned to third manager 214c. Accordingly, first manager 214a is configured to: (1) delegate a first portion 216a of first piece of input information 212a to first worker 218a, (2) delegate a second portion 216b of first piece of input information 212a to second worker 218b, and (3) delegate a third portion 216c of first piece of input information 212a to third worker 218c. Similarly, second manager 214b is configured to delegate portions 216d through 216f of second piece of input information 212b to workers 218d through 218f, and third manager 214c is configured to delegate portions 216g through 216i of third piece of input information 212c to workers 218g through 218i. As with input level 202, because managers 214 do not perform any computations aside from delegation, default linear activation functions are applied at the nodes used to form managers 214.

While illustrated in FIG. 2 as including three managers—first manager 214a, second manager 214b, and third manager 214c—this disclosure contemplates that manager level 204 may include any number of managers 214, including zero. For example, in certain embodiments, worker level 206 may be connected directly to input level 202, rather than worker level 206 being connected to manager level 204 and manager level 204 being connected to input level 202. In such embodiments, input level 202 may be configured to split the input information into multiple pieces, one for each set of workers 218.

Additionally, while illustrated in FIG. 2 as including only one manager level 204, this disclosure contemplates that neural network 118 may include any number of manager levels 204. For example, neural network 118 may include a first manager level 204 connected to input level 202 and a second manager level 204 connected to the first manager level. The managers in the second manager level may receive information delegated to them by the managers in the first manager level. Because managers 214 are primarily concerned with breaking up the information they receive into smaller portions for the next layer below them, any number of manager levels 204 may be stacked on top of one another. For example, rather than splitting up pieces of input information 212a through 212c into portions 216a through 216i for workers 218a through 218i, managers 214 of manager level 204 may split up pieces of input information 212a through 212c into portions 216a through 216i for other managers, located in a second manager level below manager level 204. Splitting managers 214 among multiple manager levels 204, as opposed to simply using one manager level 204 and connecting a large number of managers 214 directly to input level 202, may be desirable to help avoid overwhelming input 210. For example, input 210 may become overwhelmed (e.g., less computationally efficient) when asked to break up a large problem (defined by a large amount of input information) into a large number of small problems (one for each manager 214 in the single manager level 204). Accordingly, certain embodiments of neural network 118 may increase the efficiency of neural network 118 by, for example, having input 210 break up the large problem into a number of medium-sized problems for managers 214 in a first manager level 204, and having managers 214 in the first manager level 204 then break up the medium-sized problems into a number of smaller-sized problems for managers 214 in a second manager level 204.

As illustrated in FIG. 2, below manager level 204 is worker level 206. There will always be at least one worker level 206 in neural network 118, because worker level 206 is where actual computation and problem solving occurs. Worker level 206 includes any number of workers 218a through 218i, with each worker 218 assigned to a given manager 214 of manager level 204. While, FIG. 2 illustrates three workers 218 assigned to each manager 214, this disclosure contemplates that any number of workers 218 may be assigned to each manager 214.

Each worker 218 includes any number of layers of processing nodes. For example, each worker 218 may include an input layer of nodes, one or more hidden layers of nodes, and an output layer of nodes. This disclosure contemplates that the construction and number of nodes chosen for workers 218 will likely depend on the type of problem that neural network 118 is designed to solve. The architecture that may be used for each worker 218 is described in more detail below, in the discussion of FIGS. 3A and 3B.

Each worker 218 of neural network 118 is generally unaware of the other workers 218 in the network. For example, worker 218a is generally unaware of the other workers 218b through 218i. Worker 218a is also generally unaware of second manager 214b and third manager 214c. In this manner, each worker 218 may become specialized to answer a smaller problem of the larger input problem provided to the network, where the smaller problem is defined by the portion of the input information 216 provided to it by its manager 214. As a concrete example, in certain embodiments, neural network 118 may be configured to analyze credit card transactions to determine whether the transactions are valid. Many factors may play a role in helping to determine whether a transaction is valid or not. Such factors may include information about the location at which the transaction occurred, the size of the transaction, the item purchased during the transaction, etc. In certain embodiments, first manager 214a may be configured to delegate information about the location at which the transaction occurred to first worker 218a. First worker 218a may then be trained to operate on this location information to determine whether the transaction is valid, based on the location information, without knowledge of any of the other information, such as the size of the transaction and the item purchased during the transaction that other workers 218 may be operating on.

As illustrated in FIG. 2, following worker level 206 is output level 208. Output level 208 may include a concatenation layer 220 and an output layer 222. Concatenation layer 220 is configured to receive the output from each worker 218, as well as the original input information fed into neural network 118. Concatenation layer 220 may also be configured to receive information regarding the delegation of the input information to managers 214 and/or workers 218. Concatenation layer 220 is configured to analyze the output from individual workers 218 to determine a solution to the problem presented to neural network 118 through input 210. For example, concatenation layer 220 may be configured to determine which calculations performed by workers 218 are relevant and which can safely be ignored, because the workers 218 performing the calculations were not specialized for the type of problem being handled. Concatenation layer 220 is connected to output layer 222. Output layer 222 is configured to output the answer to the problem defined by the input information and marks the end of the architecture of neural network 118.

FIG. 3A presents an example worker 218a. Worker 218a may include a set of processing nodes arranged into a set of layers. For example, worker 218a may include one or more convolutional layers, dropout layers, densely connected layers, and/or any other computational layers. As an example, FIG. 3A illustrates the use of densely connected layers for worker 218a. As illustrated in FIG. 3A, worker 218a includes an input layer 302 that includes input nodes 312a through 312d, a first hidden layer 304 that includes nodes 314a through 314f, a second hidden layer 306 that includes nodes 316a through 316f, a third hidden layer 308 that includes nodes 318a through 318f, and an output layer 310 that includes nodes 320a through 320b. Input layer 302 receives first portion 216a of first piece of input information 212a. While illustrated in FIG. 3A as including four processing nodes, 312a through 312d, input layer 302 may include any number of input nodes 312. First hidden layer 304 includes hidden nodes 314a through 314f that are densely connected to input nodes 312a through 312d (i.e., each node 314 receives as input information generated by each and every input node 312a through 312d). Similarly, the first layer of hidden nodes 314a through 314f is densely connected to the second layer of hidden nodes 316a through 316f (i.e., each node 314 provides its output as input to each node 316). In a similar manner, second hidden layer 306 is densely connected to third hidden layer 308, and third hidden layer 308 is densely connected to output layer 310. While illustrated in FIG. 3A as including three hidden layers—first hidden layer 304, second hidden layer 306, and third hidden layer 308—worker 218a may include any number of zero or more hidden layers. Furthermore, while illustrated in FIG. 3A as including six nodes each, hidden layers 304 through 308 may include any number of processing nodes. The final layer of worker 218a is output layer 310. Output layer 310 includes output nodes 320. While illustrated in FIG. 3A as included two output nodes 320a and 320b, output layer 310 may include any number of output nodes 320. Output layer 310 provides the output of worker 218a to concatenation layer 220 of output level 208.

As is conventional in traditional neural networks, the nodes forming each layer of workers 218 may be equipped with an activation function, used to perform computation on the input data the nodes receive. The nodes forming each worker 218 may be equipped with any type of activation function. For example, the nodes may be equipped with linear activation functions, non-linear activation functions, sigmoid or logistic activation functions, hyperbolic tangent activation functions, rectified linear activation functions, leaky rectified linear activation functions, and/or any other suitable activation functions. Different processing nodes in the same worker 218a may be equipped with different activation functions. For example, node 314a may be equipped with a different activation function from node 316c. In certain embodiments, workers 218a through 218i are each equipped with the same type of activation functions. In some embodiments, workers 218a through 218i are equipped with different types of activation functions.

FIG. 3B illustrates an example of the use of an activation function $f$, assigned to node 314c. Node 314c receives as input the output from nodes 312a through 312d of input layer 302. For example, node 314c receives output $x_1$ from node 312a, output $x_2$ from node 312b, output $x_3$ from node 312c, and output $x_4$ from node 312d. Node 314 generates a sum of these outputs, appropriately weighted by weights $w_1$ through 1424, defining the strength of the connections between nodes 312a through 312d and node 314c. For example, node 314 determines the sum of $x_1w_1+x_2w_2+x_3w_3+x_4w_4$. To this sum, node 314 adds bias, b. Node 314 then applies activation function $f$ to the result, to generate output 322. As is common in traditional neural networks, this disclosure contemplates that weights, w, and biases, b, are adjustable and may be adjusted during the training process for neural network 118, as described in further detail below.

Figure 4:
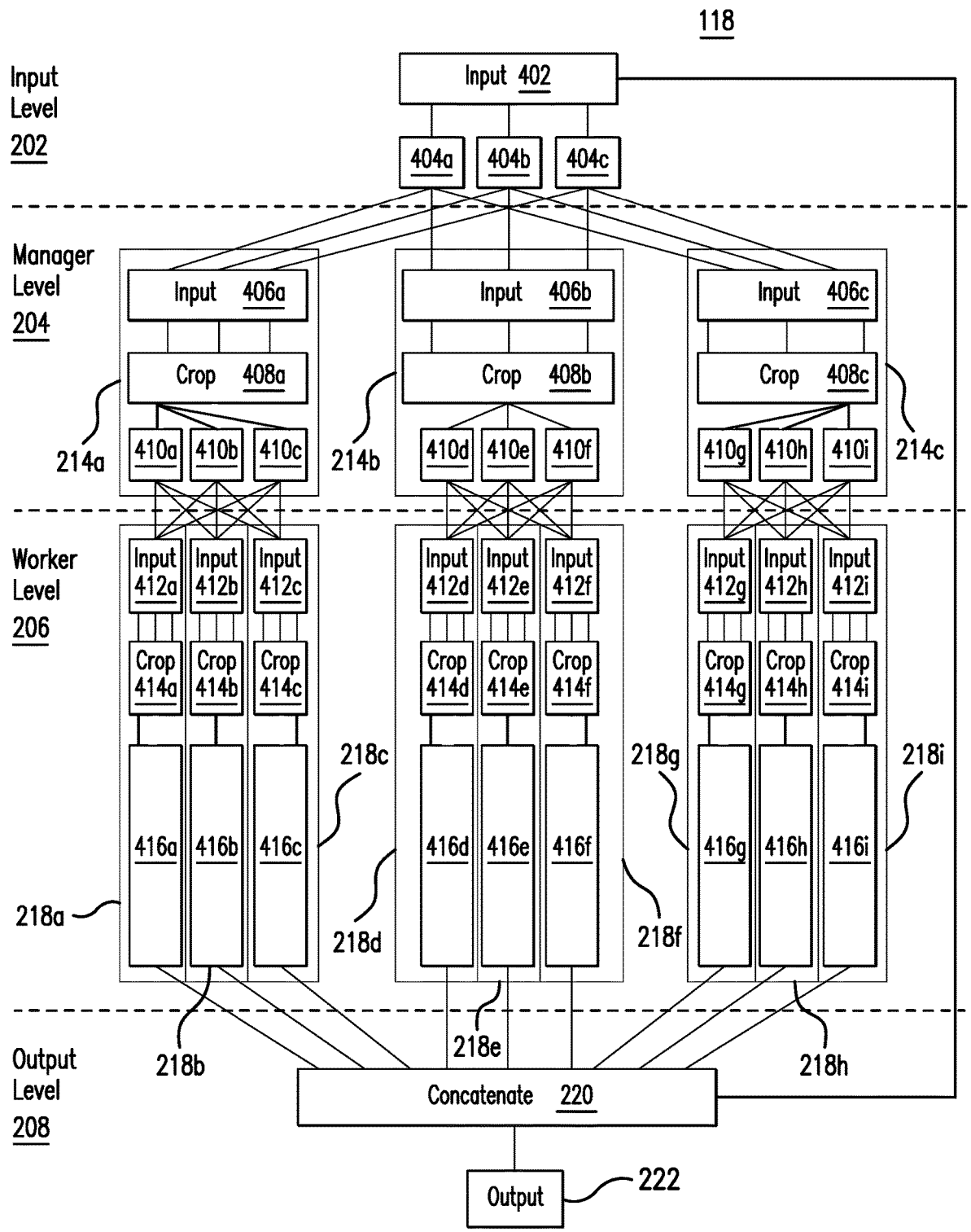
FIG. 4 illustrates an example knowledge persistent and structurally dynamic neural network that uses cropping layers to delegate information to nodes within the network.

In certain embodiments, neural network 118 may use a set of cropping layers to delegate information down to workers 218. FIG. 4 presents an example of a neural network 118 that includes such cropping layers.

Neural network 118, as illustrated in FIG. 4, includes the same basic components as those illustrated in FIG. 2—an input level 202, a manager level 204, a worker level 206, and an output level 208. As illustrated in FIG. 4, manager level 204 includes three managers 214a through 214c, and worker level 206 includes three workers 218 per manager 214.

Input level 202 includes an input layer 402 and a densely connected layer made up of units 404a through 404c. Input layer 402 is configured to receive the input information that is used to define the problem on which neural network 118 is to operate. In response to receiving the input information, input layer 402 is configured to split up the information into multiple pieces 212a through 212c, one piece for each unit 404. Each unit 404 may include one or more processing nodes. Input level 202 includes one unit 404 for each manager 214 in manager level 204. Accordingly, by splitting up the input information into first piece 212a for unit 404a, second piece 212b for unit 404b, and third unit 212c for unit 404c, input level 202 acts to split up the input information into pieces 212a through 212c for managers 214a through 214c.

Following input level 202 is manager level 204. Each manager 214a through 214c of manager level 204 begins with an input unit 406. For example, first manager 214a includes input unit 406a, second manager 214b includes input unit 406b, and third manager 214c includes input unit 406c. Each input unit 406 may include one or more processing nodes. Each unit 404a through 404c of input level 202 is densely connected to input units 406a through 406c of manager level 204. Because units 404a through 404c should not transform the input information in any way other than to split it up for the levels below, the nodes within these units use default linear activations.

Given that each unit 404a through 404c of input level 202 is densely connected to input units 406a through 406c of manager level 204, each input unit 406a through 406c receives access to all of the information handed down by input level 202 (e.g., each input unit 406a through 406c receives access to each piece of input information 212a through 212c). Accordingly, each manager 214a through 214c receives access to all of the information handed down by input level 202. This is contrary to the idea discussed in the context of FIG. 2, that each manager 214a through 214c should receive access to a single piece of input information (e.g., first manager 214a should receive access to first piece of input information 212a, second manager 214b should receive access to second piece of input information 212b, and third manager 214c should receive access to third piece of input information 212c). However, immediately following the layer of input units 406a through 406c in manager level 204 is a layer of cropping units 408a through 408c. Each cropping unit 408 is configured to crop out all but one of the pieces of input information 212a through 212c received from its corresponding input unit 406. For example, cropping unit 408a receives first piece of input information 212a, second piece of input information 212b, and third piece of input information 212c from input unit 406a, and is configured to crop out all but first piece of input information 212a. Similarly, cropping unit 408b is configured to crop out all but second piece of input information 212b, and cropping unit 408c is configured to crop out all but third piece of input information 212c. In this manner, each manager 214 is able to purposefully discard all but the piece of input information 212 assigned to it by input level 202, before delegating portions of this information to its workers 218. This allows neural network 118 to employ a manager level 204 that is densely connected to input level 202, while nevertheless delegating separate pieces of input information 212a through 212c to each manager 214.

Attached to each of cropping units 408a through 408c is a densely connected layer made up of units 410, where each unit 410 may include one or more processing nodes. The number of units 410 attached to each cropping unit 408a through 408c is defined by the ratio of workers to managers in neural network 118. For example, as illustrated in FIG. 4, three workers are assigned to each manager. Accordingly, three units 410 are connected to each cropping unit 408— units 410a through 410c are connected to cropping unit 408a, units 410d through 410f are connected to cropping unit 408b, and units 410g through 410i are connected to cropping unit 408c. Each unit 410 receives a portion 216 of the piece of input information 212 remaining after the operation of the associated cropping unit 408. For example, unit 410a receives first portion 216a of first piece of input information 212a, unit 410b receives second portion 216b of first piece of input information 212a, and unit 410c receives third portion 216c of first piece of input information 212a. Similarly, unit 410d receives first portion 216d of second piece of input information 212b, unit 410e receives second portion 216e of second piece of input information 212b, unit 410f receives third portion 216f of second piece of input information 212b, unit 410g receives first portion 216g of third piece of input information 212c, unit 410h receives second portion 216h of third piece of input information 212c, and unit 410i receives third portion 216i of third piece of input information 212c. Thus, the densely connected layers of units 410 effectively split up pieces of input information 212 into portions 216 that are delegated to the workers in worker level 206.

Additionally, as described above, in the discussion of FIG. 2, while illustrated in FIG. 4 as including only one manager level 204, this disclosure contemplates that neural network 118 may include any number of manager levels 204. For example, neural network 118 may include a first manager level 204 connected to input level 202 and a second manager level 204 connected to the first manager level. The managers in the second manager level may receive information delegated to them by the managers in the first manager level. Because managers 214 are primarily concerned with breaking up the information they receive into smaller portions for the next layer below them, any number of manager levels 204 may be stacked on top of one another. For example, rather than splitting up pieces of input information 212a through 212c into portions 216a through 216i for workers 218a through 218i, managers 214 of manager level 204 may split up pieces of input information 212a through 212c into portions 216a through 216i for other managers, located in a second manager level below manager level 204.

In embodiments in which neural network 118 uses a set of cropping layers to delegate information down to workers 218, each manager level may include its own set of input units 406 and cropping units 408. For example, each manager 214 in a second manager level 204 may include an input unit 406 and a cropping unit 408. Each input unit 406 of a manager 214 in the second manager level 204 may be connected to the set of units 410 belonging to a manager 214 in the first manager level 204, and therefore receive information from the manager 214 in the first manager level 204. Each cropping unit 408 of the manager 214 in the second manager level 204 may then crop out all but a portion of the information received from the manager 214 in the first manager level 204, before delegating portions of this information to other managers 214 in a third manager level 204 (if neural network 118 includes three or more manager levels 204), or workers in worker level 206 (if neural network 118 includes two manager levels 204).

Following manager level 204 is worker level 206. Each worker 218a through 218i of worker level 206 begins with an input unit 412. For example, first worker 218a includes input unit 412a, second worker 218b includes input unit 412b, third worker 218c includes input unit 412c, fourth worker 218d includes input unit 412d, etc. Each input unit 412 may include one or more processing nodes. The set of units 410 belonging to a given manager 214 are densely connected to the input units 412 of the workers 218 assigned to the given manager 214. For example, units 410a through 410c of first manager 214a are densely connected to input units 412a through 412c, units 410d through 410f are densely connected to input units 412d through 412f, and units 410g through 410i are densely connected to input units 412g through 412i. Because units 410 should not transform the pieces of input information in any way other than to split it up for the workers below, the nodes within these units use default linear activations.

Given that the set of units 410 belonging to a given manager 214 are densely connected to the input units 412 of the workers 218 assigned to the given manager 214, each input unit 412 of a worker 218 assigned to a given manager 214 receives access to all of the information on which the manager 214 operates (e.g., each input unit 412a through 412c, belonging to manager 214a, receives access to each portion 216a through 216c of the first piece of input information 212a). This is contrary to the idea discussed in the context of FIG. 2, that each worker 218a through 218i should receive access to a portion 216 of the piece of input information 212 on which the manager 214 belonging to worker 218 operates (e.g., first worker 218a should receive access to first portion 216a of first piece of input information 212a, second worker 218b should receive access to second portion 216b of first piece of input information 212a, third worker 218c should receive access to third portion 216c of first piece of input information 212a, etc.). However, immediately following the layer of input units 412 in worker level 206 is a layer of cropping units 414. Each cropping unit 414 is configured to crop out all but one of the portions 216 of the piece of input information 212 received from its corresponding input unit 412. For example, cropping unit 414a receives first portion 216a of first piece of input information 212a, second portion 216b of first piece of input information 212a, and third portion 216c of first piece of input information 212a from input unit 412a, and is configured to crop out all but first portion 216a of first piece of input information 212a. Similarly, cropping unit 414b is configured to crop out all but second portion 216b of first piece of input information 212a, and cropping unit 414c is configured to crop out all but third portion 216c of first piece of input information 212a. Cropping units 414d through 414f operate in a similar manner for portions 216d through 216f of second piece of input information 212b, as do cropping units 414g through 414i for portions 216g through 216i of third piece of input information 212c. In this manner, each worker 218 is able to purposefully discard all but the portion 282 of the piece of input information 212 assigned to it by its corresponding manager 214. This allows neural network 118 to employ a set of workers 218 that that are densely connected to a manager 214, while nevertheless having manager 214 delegate separate portions 216 of the piece of input information 212 on which it is operating to each of its assigned workers 218.

Following cropping units 414a through 414i are sets of worker nodes 416a through 416i. Each set of worker nodes 416 is connected to a cropping unit 414 and is configured to receive, as input, the portion 216 of the piece of input information 212 remaining after the operation of the cropping unit. For example, first set of worker nodes 416a is configured to receive first portion 216a of first piece of input information 212a from cropping unit 414a, second set of worker nodes 416b is configured to receive second portion 216b of first piece of input information 212a from cropping unit 414b, third set of worker nodes 416c is configured to receive third portion 216c of first piece of input information 212a from cropping unit 414c, etc. Each set of worker nodes 416a through 416i includes one or more layers of processing nodes, and operates in the same manner as described above, for workers 218, in the discussion of FIG. 2. The output of each set of worker nodes 416a through 416i is provided to output level 208. Output level 208 is configured to operate on these local outputs to generate a global output for the network, as described above, in the discussion of FIG. 2.

III. Generating and Training the Neural Network

Neural network 118 may be generated in any suitable manner. For example, in certain embodiments, neural network tool 102 may receive a request 126 to generate neural network 118. Request 126 may include a specification of the number of managers 214 to include in neural network 118, as well as the ratio of workers 218 to managers 214. For example, request 126 may specify that neural network 118 is to include 3 managers 214 as well as 3 workers 218 per manager 214. In response to receiving such information, neural network tool 102 may generate neural network 118, as illustrated in FIG. 2. As another example, request 126 may specify that neural network 118 is to include 2 managers 214 and 4 workers 218 per manager 214. In response, neural network tool 102 may generate a neural network 118 that includes 2 managers 214 and 8 total workers 218. In some embodiments, request 126 may simply specify a single number, which governs both the number of managers 214 and the number of workers 218 per manager 214. For example, request 126 may specify the number 3, to indicate that neural network 118 should include 3 managers 214 and 3 workers 218 assigned to each manager 214. In certain embodiments, request 126 may specify the number of manager levels 204 to include in neural network 118.

In certain embodiments, request 126 may also include a specification of the type of problem that neural network 118 is to solve. For example, request 126 may indicate the type of input information that neural network 118 is to operate on. Request 126 may additionally include a specification of the desired architecture for workers 218. For example, request 126 may indicate that workers 218 should include three densely connected layers of nodes, each layer containing twenty nodes, with each node assigned a hyperbolic tangent activation function.

As described above, in the discussion of FIG. 1, training module 120 of neural network tool 102 may be configured to generate and train neural network 118. For example, in response to receiving a specification of the number of managers 214 to include in neural network 118, the number of workers 218 per manager 214 to include in neural network 118, the type of problem that neural network 118 is to solve, and/or the desired architecture for workers 218, training module 120 of neural network tool 102 may generate neural network 118 by forming input level 202, manager level 204, worker level 206, and output level 208 of neural network 118. Training module 120 may then store neural network 118 in memory 116.

Once training module 120 has generated the architecture for neural network 118, training module 120 may train neural network 118. For example, in certain embodiments, training module 120 may access training data 112, stored in database 110, to train neural network 118. In some embodiments, training module 120 may receive training data 112 through request 126.

Training data 112 may include information defining a set of training questions along with corresponding information defining a set of training answers. Training neural network 118 may include, for each training question in the set of training questions, providing neural network 118 with the information defining the training question, by providing such information to input level 202. Input 210 of input level 202 may then split the input information into a set of pieces 212a through 212c, one piece 212 for each manager 214a through 214c in manager level 204. Each manager 214a through 214c may then delegation portions 216 of its piece of input information 212 to its assigned workers 218. Workers 218 may then operate on their portions 216 of input information to generate output information, which they then pass to concatenation layer 220 of output level 208. Concatenation layer 208 may then process the output from each of workers 218a through 218i, along with the original input information received from input 210, to generate output 222, which corresponds to neural network 118's determination of the solution to the training question provided to the network. Training module 120 may then compare the output generated by neural network 118 with the training answer provided in training data 112, and provide the difference between the output and the training answer to neural network 118. Neural network 118 may then make adjustments to the network in an attempt to minimize this difference upon future applications of the adjusted network. For example, in certain embodiments, neural network 118 may use this difference to adjust the weights, w, and biases, b, assigned to the nodes used to form workers 218a through 218i. In some embodiments, neural network 118 may use the difference to adjust the pieces of input information 212a through 212c passed to managers 214a through 214c, and/or to adjust the portions 216 of the pieces of input information 212 delegated by managers 214. Neural network 118 may make adjustments to its weights, biases, and/or portions of delegated information in any suitable manner. For example, in certain embodiments, neural network 118 may use a back-propagation algorithm.

An example algorithm for training module 120 is as follows: (1) receive request 126 specifying the number of managers 214 to include in neural network 118, the ratio of workers 218 to managers 214, and the desired architecture for workers 218; (2) generate neural network 118, by forming input level 202, manager level 204, worker level 206, and output level 208 according to the number of managers 214, the ratio of workers 218 to managers 214 specified in request 126, and the desired architecture for workers 218; (3) for each training question in training data 112, provide the information defining the training question to input level 202 of neural network 118; (4) apply neural network 118 to the information; (5) receive output 222 from neural network 118; (6) compare output 222 to the training answer provided in training data 112; (7) provide the difference between output 222 and the training answer to neural network 118, which uses a back-propagation algorithm to make adjustments to its weights, biases, and/or portions of delegated information; (8) repeat for each training question in training data 112, or until the difference between output 222 and the corresponding training answer is smaller than a given tolerance.

IV. Modifying the Neural Network Architecture

Figure 5A:
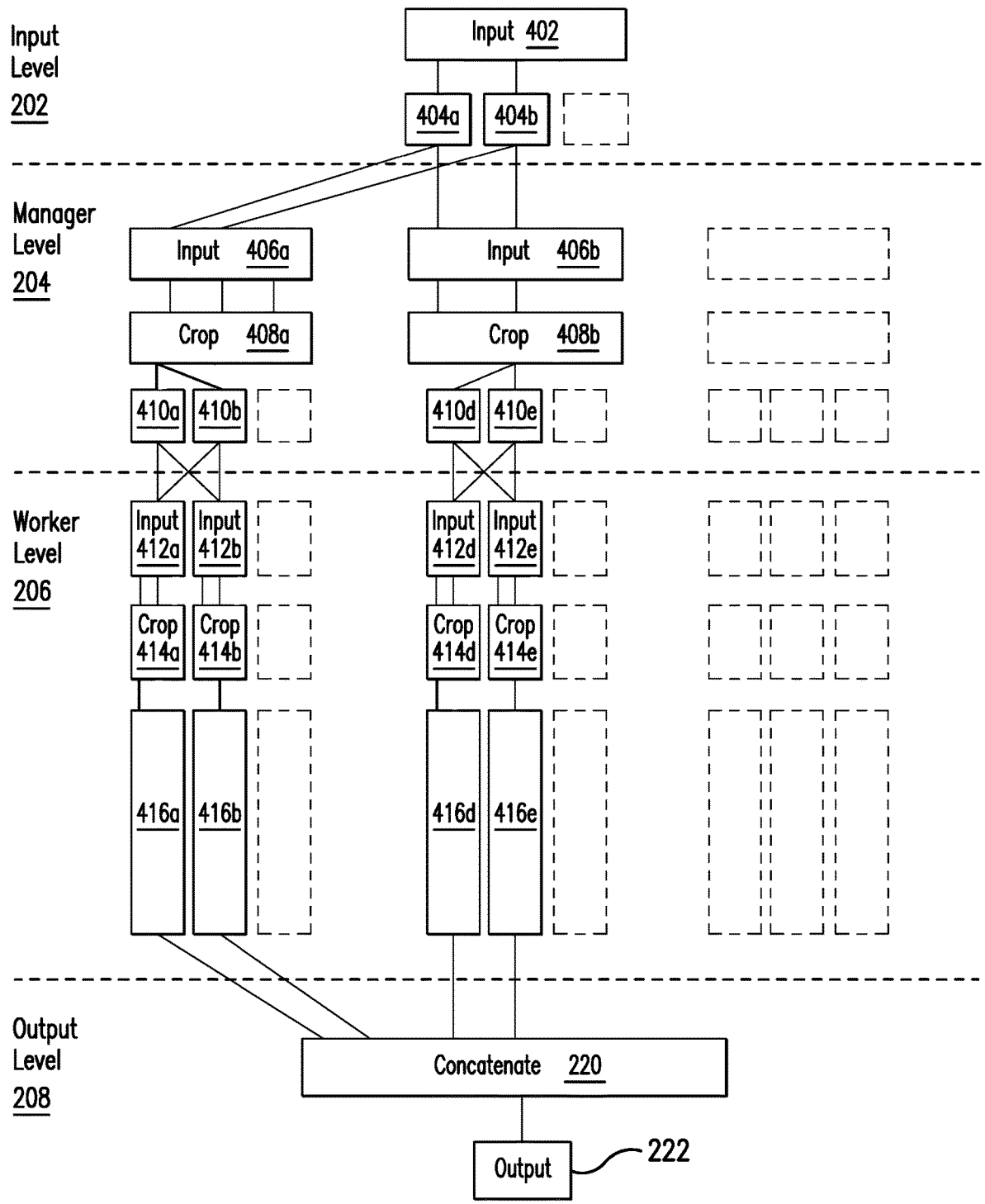
FIGS. 5A and 5B present examples of modifications that may be performed to the architecture of the neural network of FIG. 4.
Figure 5B:
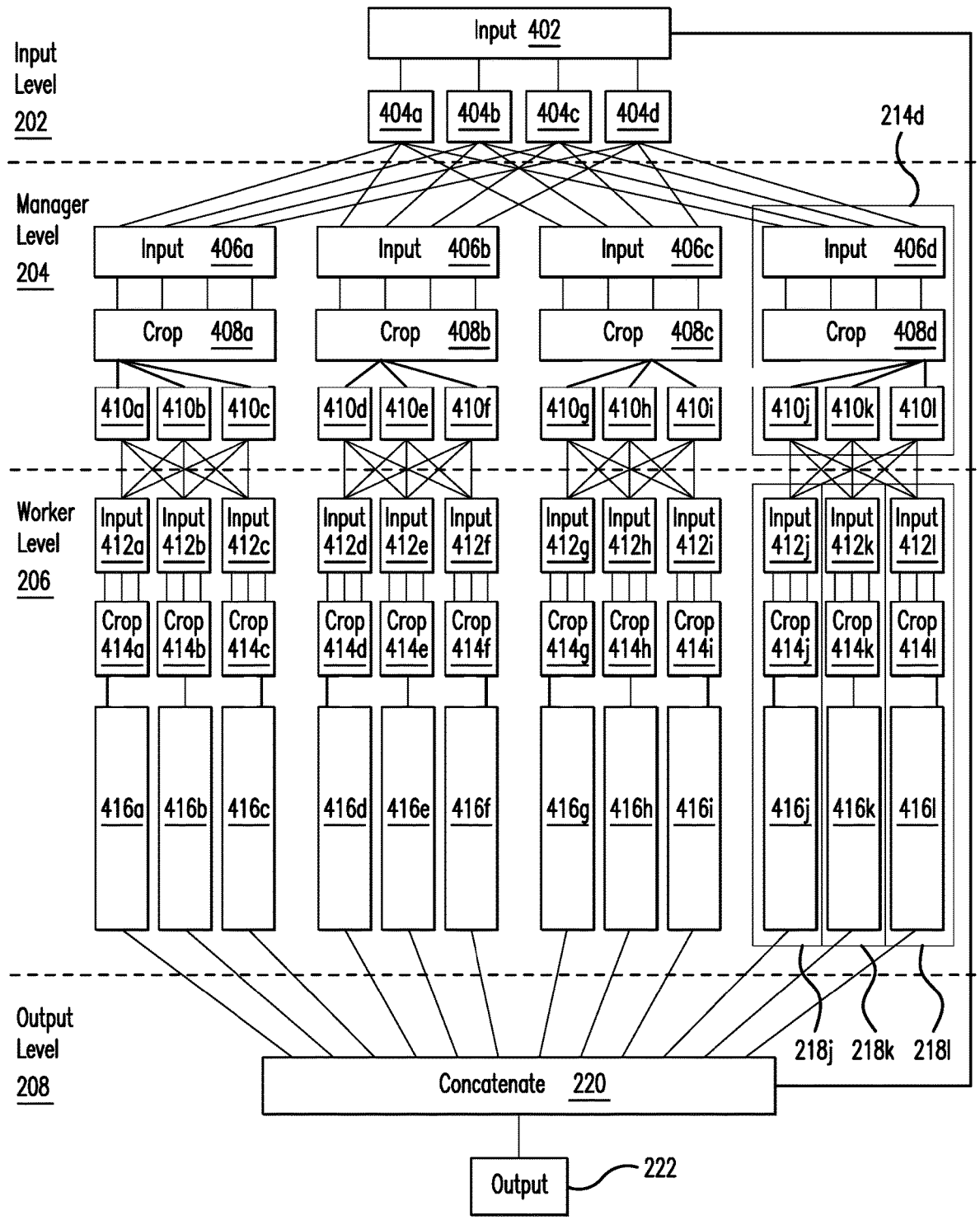

FIGS. 5A and 5B illustrate examples of modifications that may be performed to the architecture of neural network 118. In certain embodiments, such modifications may be performed on a trained neural network 118 without resulting in the need to retrain neural network 118 from the ground up.

FIG. 5A illustrates an example in which nodes are removed from neural network 118. Nodes may be removed from neural network 118 by removing one or more managers 214 (along with workers 218 assigned to such managers 214) from neural network 118, removing one or more workers 218 assigned to a given manager 214 from neural network 118, and/or removing one or more layers of nodes from a worker 218. Nodes may be removed from neural network 118 for any suitable reason. For example, in certain embodiments, nodes may be removed from an existing neural network 118 to streamline the neural network so that it may be embedding into a mobile device with limited hardware capacity. As another example, in certain embodiments, nodes may be removed from an existing neural network 118 to increase the efficiency of the neural network (e.g., the existing neural network may have been implemented with more nodes than necessary to satisfactorily solve the problem the network was designed to solve, resulting in an unnecessary waste of computational resources).

FIG. 5A illustrates an example in which manager 214c is removed from neural network 118, as well as worker 218c, belonging to manager 214a, and worker 218f, belonging to manager 214b. As illustrated in FIG. 5A, removing third manager 214c results in the removal of (1) unit 404c of input level 202, (2) input unit 406c, cropping unit 408c, and units 410g through 410i of manager level 204, and (3) input units 412g through 412i, cropping units 414g through 414i, and sets of worker nodes 416g through 416i from worker level 206. Also, as illustrated in FIG. 5A, removing third worker 218c, assigned to first manager 214a results in the removal of (1) unit 410c of manager level 204, and (2) input unit 410c, cropping unit 414c, and set of nodes 416c of worker level 206. Similarly, removing third worker 218f, assigned to second manager 214b, results in the removal of (1) unit 410f of manager level 204, and (2) input unit 410f, cropping unit 414f, and set of nodes 416f of worker level 206.

In certain embodiments, modification module 124 may be configured to remove nodes from neural network 118. As an example, modification module 124 may be configured to remove nodes from neural network 118 in response to receiving a request 126 to reduce the size of neural network 118. This disclosure contemplates that a request 126 to reduce the size of neural network 118 may take any suitable form. For example, in certain embodiments, both the number of managers 214 in neural network 118 and the number of workers 218 per manager 214 in neural network 118 may be set by a value defining the worker to manager ratio. In such embodiments, request 126 may indicate that modification module 124 is to reduce the size of neural network 118 by specifying an amount by which to decrease the worker to manager ratio. As an example, as illustrated in FIG. 5A, the size of the original neural network 118 may be set by a worker to manager ratio of 3, indicating that neural network 118 is to include 3 managers 214 and 3 workers 218 per manager 214. Modification module 124 may then receive a request 126 to decrease the worker to manager ratio to 2. Accordingly, modification module 124 may remove one manager 214 from neural network 118 (along with all of the workers 218 assigned to the manager) as well as one worker 218 per each of the remaining managers 214, such that the adjusted neural network 118 includes 2 manager 214 and 2 workers 218 per manager 214. In some embodiments, the number of managers 214 and the ratio of workers 218 to manager 214 may be set independently of one another. In such embodiments, request 126 may indicate that modification module 124 is to reduce the size of neural network 118 by removing one or more managers 214 (along with all of the workers 218 assigned to such managers and/or, in embodiments that include more than one manager level 204, managers 214 assigned to such managers) and/or removing one or more workers 218 from each manager 214. In addition to removing entire workers 218 from neural network 118, in certain embodiments, modification module 124 may be configured to remove one or more layers of nodes from a worker 218. For example, modification module 124 may remove a layer of nodes from first worker 218a. Since the remaining workers 218 are generally unaware of first worker 218a, such a change to first worker 218a should not impact the remaining workers 218.

In response to modification module 124 removing nodes from neural network 118, neural network tool 102 may be configured to implement training module 120 to retrain neural network 118. For example, if the amount of input information provided to input level 202 is not changed, then in response to removing manager 214c from neural network 118, input 402 will split the input information into two pieces—first piece 505a, for first manager 214a, and second piece 505b, for second manager 214b— rather than splitting the input information into three pieces 212a through 212c. As a result, managers 214a and 214b will delegate additional information to the remaining workers 218a, 218b, 218d, and 218e (e.g., the remaining workers 218 may be asked to some somewhat more complicated problems than those they were solving initially). Accordingly, training module 120 may be implemented to retrain such workers to adjust to the additional information they receive. While the workers may need to adjust slightly to this additional information, in certain embodiments, they are able to continue using some of their historical learning, without having to be retrained from the ground up.

FIG. 5B illustrates an example in which nodes are added to neural network 118. Nodes may be added to neural network 118 by adding one or more managers 214 (along with workers 218 assigned to such managers 214) to neural network 118, adding one or more workers 218 to a given manager 214 of neural network 118, and/or adding one or more layers of nodes to a given worker 218. Nodes may be added to neural network 118 for any suitable reason. For example, in certain embodiments, nodes may be added to neural network 118 in response to a change in the problem that neural network 118 was originally designed to solve. As an example, in certain embodiments, additional input information may become relevant to the problem, such that neural network 118 should operate on this additional input information, in addition to the original input information that defined the original problem. Accordingly, additional workers 218 may be added to neural network 118 to operate on this additional input information, leaving the original workers 218 to operate on the same portions of the original input information that they were initially trained to operate on.

FIG. 5B illustrates an example in which an additional manager 214d is added to manager level 204. As illustrated in FIG. 5B, adding manager 214d to neural network 118 results in the addition of (1) unit 404d to input level 202, (2) input unit 406d, cropping unit 408d, and units 410j through 410l to manager level 204, and (3) input units 412j through 412l, cropping units 414j through 414l, and sets of worker nodes 416j through 416l to worker level 206.

In certain embodiments, modification module 124 may be configured to add nodes to neural network 118. As an example, modification module 124 may be configured to add nodes to neural network 118 in response to receiving a request 126 to increase the size of neural network 118. This disclosure contemplates that a request 126 to increase the size of neural network 118 may take any suitable form. For example, in certain embodiments, both the number of managers 214 in neural network 118 and the number of workers 218 per manager 214 in neural network 118 may be set according to a value defining the worker to manager ratio. In such embodiments, request 126 may indicate that modification module 124 is to increase the size of neural network 118 by specifying an amount by which to increase the worker to manager ratio. As an example, the size of the original neural network 118 may be set by a worker to manager ratio of 3, indicating that neural network 118 is to include 3 managers 214 and 3 workers 218 per manager 214. Modification module 124 may then receive a request 126 to increase the worker to manager ratio to 4. Accordingly, modification module 124 may add one manager 214d to neural network 118 (along with a set of workers 218j through 218i assigned to manager 214d) as well as adding one worker 218 per each of the original managers 214, such that the adjusted neural network 118 includes 4 managers 214 and 4 workers 218 per manager 214. In some embodiments, the number of managers 214 and the ratio of workers 218 to manager 214 may be set independently of one another. In such embodiments, request 126 may indicate that modification module 124 is to increase the size of neural network 118 by adding one or more managers 214 (along with a set of workers 218 assigned to each such manager) and/or adding one or more workers 218 to each manager 214. In addition to adding entire workers 218 to neural network 118, in certain embodiments, modification module 124 may be configured to add one or more layers of nodes to a worker 218. For example, modification module 124 may add a layer of nodes from first worker 218a. Since the remaining workers 218 are generally unaware of first worker 218a, such a change to first worker 218a should not impact the remaining workers 218.

In response to modification module 124 adding nodes to neural network 118, neural network tool 102 may be configured to implement training module 120 to retrain neural network 118. For example, in response to adding manager 214d to neural network 118, input 402 will split the input information received by input 402 into four pieces—first piece 510a, for first manager 214a, second piece 510b, for second manager 214b, third piece 510c, for third manager 214c, and fourth piece 510d for fourth manager 214d— rather than splitting the input information into three pieces 212a through 212c. Accordingly, workers 218 may need to be retrained to adjust to a new allocation of input information. In certain embodiments, manager 214d may be added to neural network 118 in response to an increase in the input information provided to input 402. In such embodiments, first piece 510a, second piece 510b, and third piece 510c of the input information may be the same as pieces 212a through 212c, while fourth piece 510d may include the additional input information. Accordingly, training module 120 may be implemented to train the new workers 218j through 218*i* to solve the sub-problem defined by fourth piece 510*d* of the input information, while the original workers 218*a* through 218*i* may continue to operate as originally trained.

V. Method of Implementing the Neural Network

Figure 6:
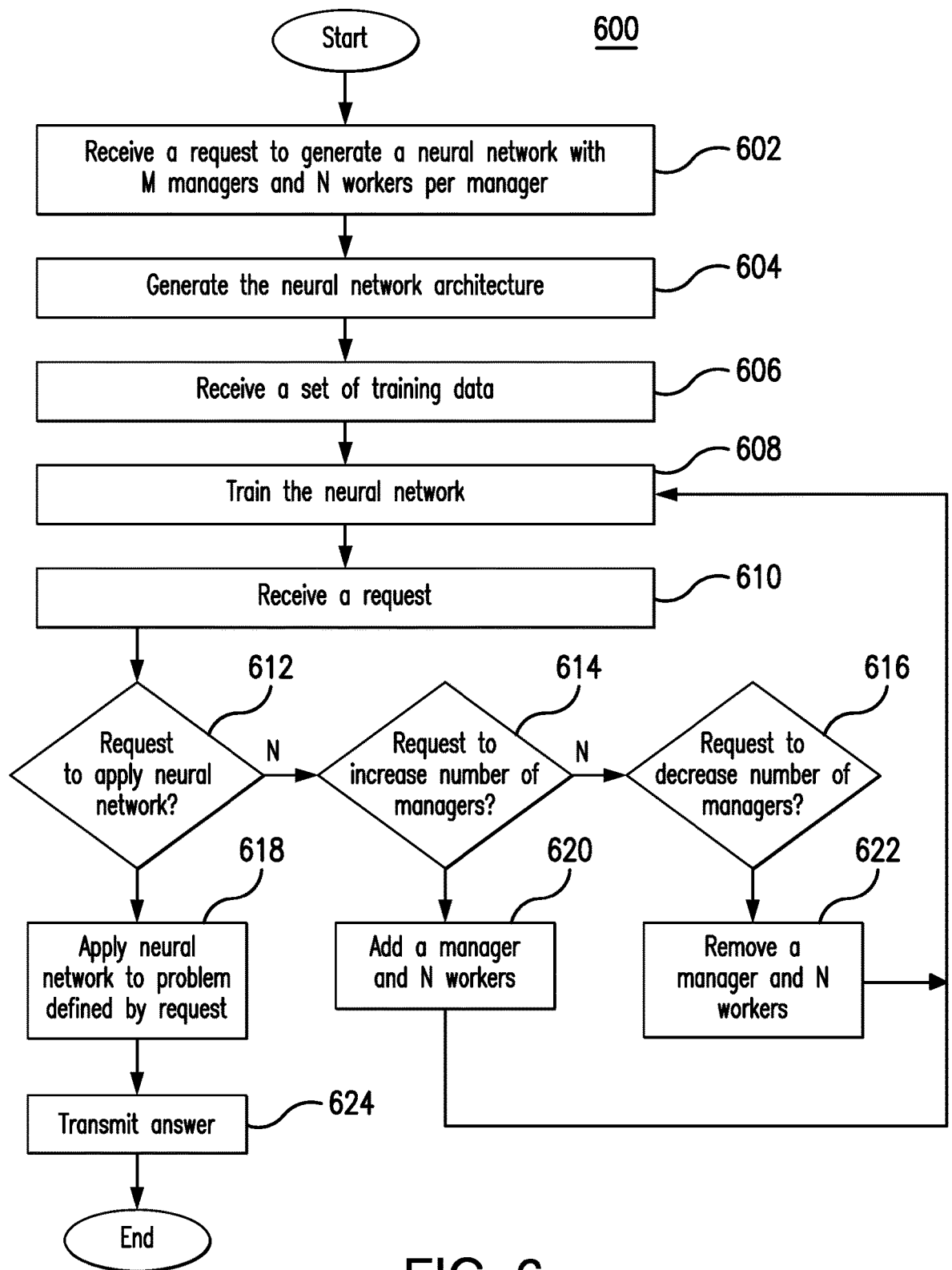
FIG. 6 presents a flowchart illustrating the process by which the neural network of FIG. 4 may be trained, modified, and used to solve a given problem.

FIG. 6 presents a flowchart illustrating the process by which neural network 118 may be trained, modified, and used to solve a given problem. In step 602 neural network tool 102 receives request 126 to generate neural network 118. Request 126 may specify that neural network 118 is to include M managers 214 and N workers 218 per manager 214. For example, request 126 may specify that neural network 118 is to include 3 managers 214 and 3 workers 218 per manager 214. In step 604 neural network tool 102 generates the architecture for neural network 118 by creating an input level 202, a manager level 204 that includes M managers 214, a worker level 206 that includes N workers 218 coupled to each manager 214, and an output level 208. Each level 202 through 208 includes one or more processing nodes.

In step 606 neural network tool 102 receives a set of training data 112 to use to train neural network 118. For example, neural network tool 102 may receive a request 126 requesting that neural network tool 102 train neural network 118 using training data 112 stored in database 110. In step 608, neural network tool 102 uses training data 112 to train neural network 118. For example, for each training question included in training data 112, neural network tool 102 provides neural network 118 with the input information used to define the training question. Neural network tool 102 then compares the output generated by neural network 118 with the training answer included in training data 112 and provides neural network 118 with the difference between the training answer and the output generated by the neural network. Neural network 118 uses this difference to adjust the weights and/or biases associated with each worker 218, and/or amounts of input information delegated to each worker 218.

In step 610, neural network tool 102 receives a request 126. In step 612 neural network tool 102 determines whether request 126 is a request to apply neural network 118 to a given problem. If, in step 610, neural network tool 102 determines that request 126 is a request to apply neural network 118 to a given problem, in step 618 neural network tool 102 applies neural network 118 to the problem defined by the request, to generate an answer to the problem. In step 624, neural network tool 102 transmits the answer to the problem as response 128.

If, in step 610, neural network tool 102 determines that request 126 is not a request to apply neural network 118 to a given problem, in step 614 neural network tool 102 determines whether request 126 is a request to increase the number of managers 214 used in neural network 118. If, in step 614, neural network tool 102 determines that request 126 is a request to increase the number of managers 214 used in neural network 118, in step 620 neural network tool 102 adds a manager 214 to neural network 118. Adding the manager to neural network 118 additionally includes adding a set of N workers assigned to the manager to neural network 118. The method then returns to step 608, where neural network tool 102 uses training data 112 to retrain the larger neural network 118. In certain embodiments, neural network tool 102 may use the same training data 112 to retrain the larger neural network 118 as was used to train the original neural network 118. For example, request 126 to increase the number of managers 214 may have been sent in response to a determination that the original size of neural network 118 was not sufficient for the types of problems that neural network 118 was designed to solve. In some embodiments, neural network tool 102 may use different training data 112 to retrain the larger neural network 118 as compared to the training data used to train the original neural network 118. For example, neural network tool 102 may use training data 112*b* to retrain the larger neural network 118, where training data 112*a* was originally used to train neural network 118. Different training data 112*b* may be used to retrain the larger neural network 118, where the problem on which neural network 118 was designed to operate has changed slightly. Training data 112*b* may correspond to this changed problem.

If, in step 614, neural network tool 102 determines that request 126 is not a request to increase the number of managers 214 used in neural network 118, in step 616 neural network tool 102 determines whether request 126 is a request to decrease the number of managers 214 used in neural network 118. If, in step 616, neural network tool 102 determines that request 126 is a request to decrease the number of managers 214 used in neural network 118, in step 622 neural network tool 102 removes a manager 214 from neural network 118. Removing the manager from neural network 118 additionally includes removing the set of N workers assigned to the manager from neural network 118. The method then returns to step 608, where neural network tool 102 uses training data 112 to retrain the smaller neural network 118.

Modifications, additions, or omissions may be made to method 600 depicted in FIG. 6. Method 600 may include more, fewer, or other steps. For example, steps may be performed in parallel or in any suitable order. While discussed as neural network tool 102 (or components thereof) performing the steps, any suitable component of system 100, such as device(s) 106 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
   a memory configured to store non-transitory computer readable instructions corresponding to a neural network, the neural network comprising:
   an input level configured, when implemented by a hardware processor, to receive input information;
   a manager level coupled to the input level, the manager level comprising a plurality of managers, each manager comprising a first plurality of nodes of the neural network, a first manager configured, when implemented by the hardware processor, to operate on a first piece of the input information;
   a worker level comprising a plurality of workers each worker comprising a second plurality of nodes of the neural network, each worker assigned to a respective single manager of the manager level, a first worker assigned to the first manager and a second worker assigned to the first manager, wherein the first manager is further configured, when implemented by the hardware processor, to:
   delegate a first portion of the first piece of the input information to the first worker, wherein the first worker is configured, when implemented by the hardware processor, to operate on the first portion of the first piece of the input information, using a first set of adjustable parameters, to generate a first output; and delegate a second portion of the first piece of the input information to the second worker, wherein the second worker is configured, when implemented by the hardware processor, to operate on the second portion of the first piece of input information, using a second set of adjustable parameters, to generate a second output; and an output level coupled to the worker level, the output level configured, when implemented by the hardware processor, to generate an output, based at least in part on the first output from the first worker and the second output from the second worker; and the hardware processor communicatively coupled to the memory, the hardware processor configured to:

receive a request to solve a problem defined by a set of information;

apply the neural network to the set of information to generate an answer to the problem, wherein the set of information corresponds to the input information received by the input level and the answer to the problem corresponds to the output from the neural network;

in response to applying the neural network, transmit a response comprising the answer to the problem;

receive a set of training data, the training data comprising training questions and corresponding training answers; and train the neural network, wherein training the neural network comprises, for each training question and corresponding training answer of the set of training data:

applying the neural network to the training question to generate the output, wherein the training question corresponds to the input information received by the input layer;

comparing the output to the corresponding training answer; and adjusting at least one of a parameter of the first set of adjustable parameters, a parameter of the second set of adjustable parameters, the first piece of the input information, the first portion of the first piece of the input information, and the second portion of the first piece of the input information, based on a difference between the output and the corresponding training answer.

2. The apparatus of claim 1, wherein:

the manager level further comprises a second manager configured, when implemented by the hardware processor, to operate on a second piece of the input information; and the worker level further comprises a third worker assigned to the second manager and a fourth worker assigned to the second manager, wherein the second manager is further configured, when implemented by the hardware processor, to:

delegate a first portion of the second piece of the input information to the third worker, wherein the third worker is configured, when implemented by the hardware processor, to operate on the first portion of the second piece of the input information to generate a third output; and delegate a second portion of the second piece of the input information to the fourth worker, wherein the fourth worker is configured, when implemented by the hardware processor, to operate on the second portion of the second piece of the input information to generate a fourth output; and the output level is further configured, when implemented by the hardware processor, to generate the output, based at least in part on the first output from the first worker, the second output from the second worker, the third output from the third worker, and the fourth output from the fourth worker.

3. The apparatus of claim 2, wherein:

the first manager comprises an input layer and a cropping layer, wherein:

the input layer of the first manager is configured, when implemented by the hardware processor, to receive the first piece of the input information and the second piece of the input information; and the cropping layer of the first manager is configured, when implemented by the hardware processor, to remove the second piece of the input information, such that the second piece of the input information is not available to both the first worker and the second worker.

4. The apparatus of claim 2, wherein the hardware processor is further configured to:

receive a request to decrease a capacity of the neural network; and in response to receiving the request to decrease the capacity:

remove the second manager from the manager level;
remove the third worker from the worker level;
remove the fourth worker from the worker level; and
retrain the neural network.

5. The apparatus of claim 1, wherein the output level comprises a concatenation layer configured, when implemented by the hardware processor, to:

receive the first output from the first worker;
receive the second output from the second worker;
receive the input information;
receive the first piece of the input information and the second piece of the input information; and
determine the output, based at least in part on the first output, the second output, the input information, the first piece of the input information, and the second piece of the input information.

6. The apparatus of claim 1, wherein the hardware processor is further configured to:

receive a request to decrease a capacity of the neural network; and in response to receiving the request to decrease the capacity:

remove the second worker from the worker level; and
retrain the neural network.

7. The apparatus of claim 1, wherein the hardware processor is further configured to:

receive a request to increase a capacity of the neural network; and in response to receiving the request to increase the capacity:

add a second manager to the manager level, the second manager configured, when implemented by the hardware processor, to operate on a second piece of the input information;

add a third worker assigned to the second manager to the worker level, wherein:

the second manager is configured, when implemented by the hardware processor, to delegate a first portion of the second piece of the input information to the third worker;
the third worker is configured, when implemented by the hardware processor, to operate on the first portion of the second piece of the input information to generate a third output; and
the output level is further configured, when implemented by the hardware processor, to generate the output, based at least in part on the first output from the first worker, the second output from the second worker and the third output from the third worker; and
retrain the neural network.

8. The apparatus of claim 1, wherein the hardware processor is further configured to:
receive a request to increase a capacity of the neural network; and
in response to receiving the request to increase the capacity of the neural network:
add a third worker assigned to the first manager, the first manager further configured, when implemented by the hardware processor, to delegate a third portion of the first piece of the input information to the third worker, wherein:
the third worker is configured, when implemented by the hardware processor, to operate on the third portion of the first piece of the input information to generate a third output; and
the output level is further configured, when implemented by the hardware processor, to generate the output, based at least in part on the first output from the first worker, the second output from the second worker and the third output from the third worker; and
retrain the neural network.

9. The apparatus of claim 1, wherein the first worker comprises at least one of:
densely connected layers of nodes;
convolutional layers of nodes; and
dropout layers of nodes.

10. A method comprising:
receiving a request to solve a problem defined by input information;
applying a neural network to the input information to generate an answer to the problem, the neural network comprising non-transitory computer readable instructions corresponding to:
an input level;
a manager level comprising a plurality of managers, each manager comprising a first plurality of nodes of the neural network;
a worker level comprising a plurality of workers each worker comprising a second plurality of nodes of the neural network, each worker assigned to a respective single manager of the manager level, a first worker assigned to a first manager and a second worker assigned to the first manager; and
an output level, wherein applying the neural network comprises:
implementing the input level to receive the input information and to provide a first piece of the input information to the first manager;
implementing the first manager to:
delegate a first portion of the first piece of the input information to the first worker; and
delegate a second portion of the first piece of the input information to the second worker;
implementing the first worker to operate on the first portion of the first piece of the input information, using a first set of adjustable parameters, to generate a first output;
implementing the second worker to operate on the second portion of the first piece of the input information, using a second set of adjustable parameters, to generate a second output; and
implementing the output level to generate an output, based at least in part on the first output from the first worker and the second output from the second worker, wherein the output comprises the answer to the problem; and
in response to applying the neural network, transmitting a response comprising the answer to the problem;
receiving a set of training data, the training data comprising training questions and corresponding training answers; and
training the neural network, wherein training the neural network comprises, for each training question and corresponding training answer of the set of training data:
applying the neural network to the training question to generate the output, wherein the training question corresponds to the input information received by the input layer;
comparing the output to the corresponding training answer; and
adjusting at least one of a parameter of the first set of adjustable parameters, a parameter of the second set of adjustable parameters, the first piece of the input information, the first portion of the first piece of the input information, and the second portion of the first piece of the input information, based on a difference between the output and the corresponding training answer.

11. The method of claim 10, wherein:
the manager level further comprises a second manager;
the worker level further comprises a third worker assigned to the second manager and a fourth worker assigned to the second manager; and
applying the neural network further comprises:
implementing the input level to provide a second piece of the input information to the second manager;
implementing the second manager to:
delegate a first portion of the second piece of the input information to the third worker; and
delegate a second portion of the second piece of the input information to the fourth worker;
implementing the third worker to operate on the first portion of the second piece of the input information to generate a third output; and
implementing the second worker to operate on the second portion of the first piece of the input information to generate a fourth output; and
the output generated by the output level is further based on the third output from the third worker and the fourth output from the fourth worker.

12. The method of claim 11, wherein:
the first manager comprises an input layer and a cropping layer; and
implementing the first manager comprises:
implementing the input layer of the first manager to receive the first piece of the input information and the second piece of the input information; and implementing the cropping layer of the first manager to remove the second piece of the input information, such that the second piece of the input information is not available to both the first worker and the second worker.

13. The method of claim 11, further comprising:
receiving a request to decrease a capacity of the neural network; and
in response to receiving the request to decrease the capacity:
  removing the second manager from the manager level;
  removing the third worker from the worker level;
  removing the fourth worker form the worker level; and
  retraining the neural network.

14. The method of claim 10, wherein:
the output level comprises a concatenation layer; and
implementing the output level comprises:
  receiving the first output from the first worker;
  receiving the second output from the second worker;
  receiving the input information;
  receiving the first piece of the input information and the second piece of the input information; and
  determining the output, based at least in part on the first output, the second output, the input information, the first piece of the input information, and the second piece of the input information.

15. The method of claim 10, further comprising:
receiving a request to decrease a capacity of the neural network; and
in response to receiving the request to decrease the capacity:
  removing the second worker from the worker level; and
  retraining the neural network.

16. The method of claim 10, further comprising:
receiving a request to increase a capacity of the neural network; and
in response to receiving the request to increase the capacity:
  adding a second manager to the manager level; and
  adding a third worker assigned to the second manager to the worker level, wherein applying the neural network further comprises:
    implementing the input level to provide a second piece of the input information to the second manager;
    implementing the second manager to delegate a first portion of the second piece of the input information to the third worker; and
    implementing the third worker to operate on the first portion of the second piece of the input information to generate a third output, wherein the output generated by the output level is further based on the third output from the third worker.

17. The method of claim 10, further comprising:
receiving a request to increase a capacity of the neural network; and
in response to receiving the request to increase the capacity of the neural network adding a third worker to the first manager; and
retraining the neural network, wherein:
  implementing the first manager further comprises delegating a third portion of the first piece of the input information to the third worker;
  applying the neural network further comprises implementing the third worker to operate on the third portion of the first piece of the input information to generate a third output; and
  the output generated by the output level is further based on the third output from the third worker.

18. The method of claim 10, wherein the first worker comprises at least one of:
densely connected layers of nodes;
convolutional layers of nodes; and
dropout layers of nodes.

* * * * *